Patented Mar. 13, 1928.

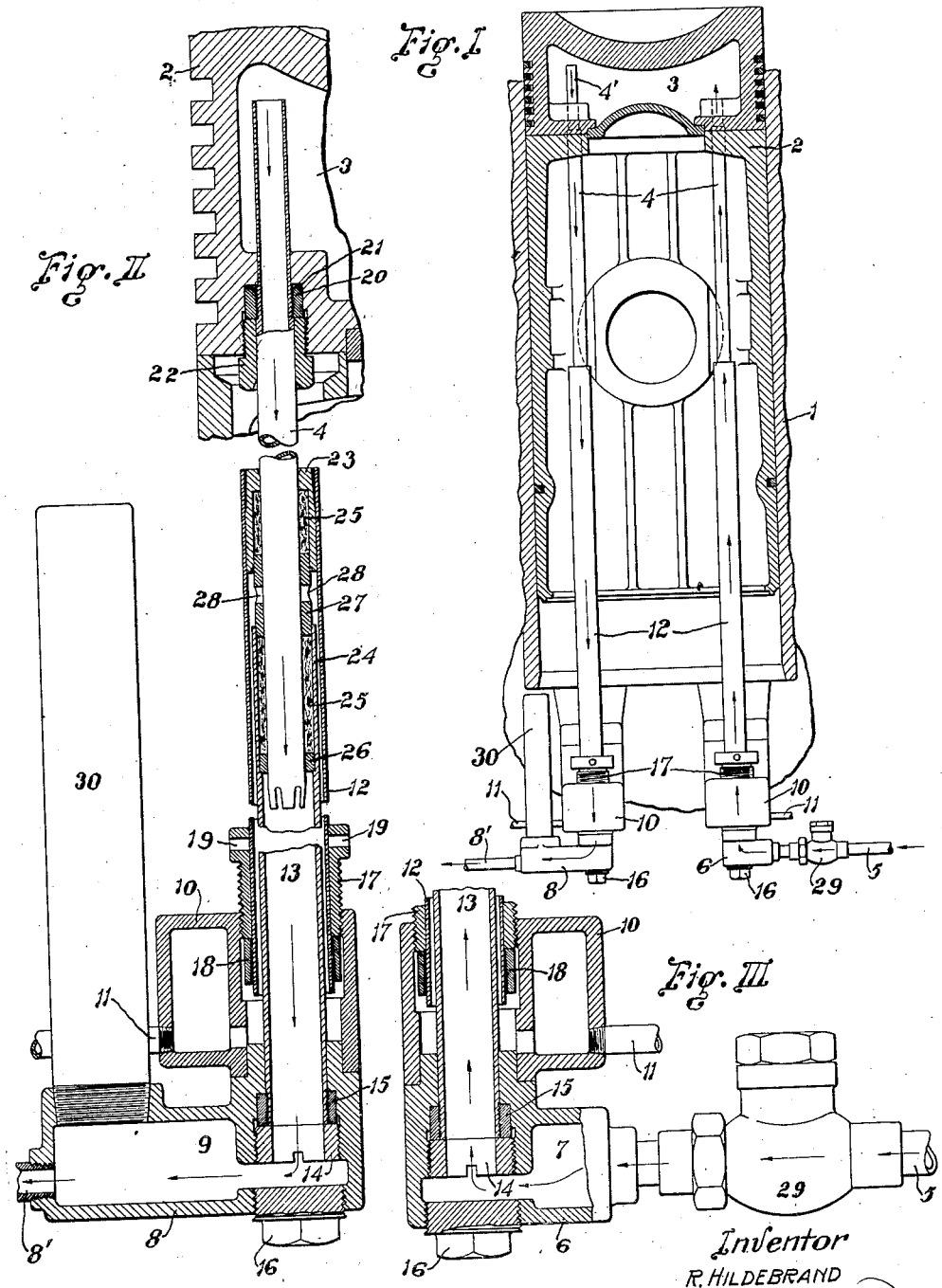

1,662,607

UNITED STATES PATENT OFFICE.

REINHARD HILDEBRAND, OF WEBSTER GROVES, MISSOURI, ASSIGNOR TO FULTON IRON WORKS COMPANY, OF ST. LOUIS, MISSOURI, A CORPORATION OF DELAWARE.

PIPE JOINT.

Application filed November 27, 1922. Serial No. 603,617.

This invention relates to pipe joints and is illustrated herein as embodied in an expansible joint of a type in which two hollow tubes are arranged one within the other for telescopic movement with relation to each other. These tubes form a continuous conduit through which a fluid may be conducted.

During the use of the telescopic joints of the foregoing character the fluid flowing through the tubes will, in the abscence of some preventative means tend to escape from the conduit between the walls of the telescopic tubes. In view of this fact, an important feature of the invention consists in the provision of a pipe joint of this character which is provided with an improved means for preventing the escape of the contents of the conduit.

An important feature of the invention which is conducive to the accomplishment of the recited object consists in providing the telescopic joint with a packing device comprising a plurality of stuffing boxes, packing material surrounding the telescopic members and held in place by means of the stuffing boxes, and a gland associated with the stuffing boxes and operable to adjust simultaneously the packing material surrounding both of the telescopic members.

These and other features and objects of the invention will become apparent from a reading of the following specification in the light of the accompanying drawings, in which:

Fig. I is a vertical section illustrating a fluid cooled piston equipped with the present invention;

Fig. II is an enlarged fragmentary vertical section showing an expansible conduit through which the cooling fluid is conducted; and Fig. III is an enlarged detail view of the lower extremity of the conduit.

As shown in Fig. I of the drawings, a cylinder 1 is equipped with a piston 2 having a hollow fluid chamber, or head, 3 formed at its upper extremity. A plurality of conduits 4 are arranged to conduct a cooling medium to the head or chamber 3. The cooling medium entering (Fig. III) through a supply pipe 5, flows past a control valve 29 in a chamber 7, formed in an elbow 6, and thence upwardly through a ring 14 and a pipe 13 to one of the conduits 4. The means for leading the cooling medium away from the piston is, as shown in Fig. II, similar to that employed in conducting the fluid into the piston and for that reason like reference numerals indicate similar parts in both Figs. II and III.

The conduits or tubes 4 are arranged to extend downwardly into the upper extremity of the tubes 13 and to move upwardly and downwardly with the piston, during which movement the tubes 13 are maintained in a stationary position. To the end of preventing the escape of the cooling medium from between the telescoped ends of the tubes 4 and 13, a gland 19 supports rigidly a tube 12 which surrounds the junction between the telescoped ends of the tubes. A stuffing box 23 is fixedly maintained in the upper extremity of the tube 12 and is provided with a suitable packing material 25. A stuffing box 26 in the form of a washer is seated upon an annular shoulder formed within the tube 13 and supports additional packing material 25. To assist in holding the packing material in place a floating gland 27 is interposed between the opposite open ends of the stuffing boxes and this gland is provided with outlet openings 28 for the discharge of water carried into the gland upon the surface of the reciprocable tube 4.

In the event that the packing material 25 within the stuffing boxes becomes loose, thereby permitting the cooling medium to escape through the stuffing boxes, it will be found necessary to adjust the stuffing boxes, and accordingly the gland 17 which is secured fixedly to the outer tube 12, is provided with recesses 19 for the reception of the tool for rotating the gland. It will be seen that such rotation causes the gland, by reason of its screw-threaded engagement with a fixed member 10, to move upwardly or downwardly, whereby the stuffing box 23 is carried with the tube 12 upwardly or downwardly according to the movement of the gland 17. The movement imparted to the stuffing box 23 is transmitted through the packing 25 to the floating gland 27 and thence to the packing 25, and it will be seen that by virtue of such a provision rotary adjustment imparted to the gland 17 causes the packing material 25 located within both of the stuffing boxes to be adjusted simultaneously and uniformly by means of the floating gland 27.

As shown, the lower open extremities of the outer tubes 12 are provided with drainage pipes 11 which conduct from the member 10 cooling medium escaping through the joint. Also the elbows 6, 8, are provided with drainage plugs 16 which afford access to the interior of the tubes 13. If desired the elbow 8 may be provided with an air compression chamber 30, which avoids extremely high pressure accumulating within the telescopic tubes, and with an outlet discharge pipe 8'.

As shown in Fig. II the upper extremity of the conduit 4 through which water is discharged from the piston is provided with a stuffing box 22 and a packing 20, 21 and is extended upwardly at 4' to insure that the water within the chamber 3 will always be maintained at a desired level.

I claim:

A packing device for an extensible conduit composed of telescoping tubes, comprising stuffing boxes associated with said telescoping tubes, each of said stuffing boxes containing a body of packing, and means for simultaneously tightening the packing in the respective stuffing boxes, said means including a double gland extending into both of said stuffing boxes and provided with a drainage outlet between said stuffing boxes.

In testimony that I claim the foregoing I hereunto affix my signature.

REINHARD HILDEBRAND.